United States Patent Office 2,744,078
Patented May 1, 1956

2,744,078

POLYESTERS FROM p, p'-SULFONYL DIBENZOIC ACID CONDENSED WITH A POLYHYDROXY COMPOUND CONTAINING AT LEAST 3 HYDROXY GROUPS

John R. Caldwell, Kingsport, Tenn., assignor to Eastman Kodak Company, Rochester, N. Y., a corporation of New Jersey No Drawing. Application October 3, 1952, Serial No. 313,069

25 Claims. (Cl. 260—22)

This application relates to valuable polyesters prepared by condensing a p, p'-sulfonyl dibenzoic acid compound with a polyoxy compound containing at least three oxy radicals.

It is an object of this invention to provide novel polyesters as described herein. It is another object of this invention to provide a process as described herein for preparing valuable polyesters. Other objects will become apparent hereinafter.

This application is a continuation in part in my co-pending application Serial No. 143,494, filed February 10, 1950, now U. S. Patent No. 2,614,120, dated October 14, 1952. In that application sulfonyl dibenzoic acid is called bis (dicarboxy diphenylsulfone.)

Polyesters of terephthalic acid and various other dibasic acids condensed with glycols have been described in the prior art. However, such known polyesters do not possess the herein described highly advantageous properties of my novel polyesters.

I have found that p, p'-sulfonyl dibenzoic acid or its esters or its acid chloride can be condensed with a polyoxy compound containing at least 3 oxy radicals to produce a new kind of polyester having highly valuable properties which are superior to those of the polyesters described in the prior art. My novel polyesters will cross-link and form insoluble products when exposed to oxygen and/or heat. They can be employed in their incompletely cross-linked, soluble form in the preparation of protective coating materials such as varnishes, lacquers, baking enamels, etc. whereby finishes are obtained that are exceptionally hard and resistant to scratching and marking. These novel cross-linked polyester coatings are insoluble in common solvents and are tough and flexible. They also have excellent resistance to water. Moreover, the novel polyesters in their soluble form can be incorporated with drying oils, alkyd resins etc. as modifiers.

My novel polyesters may contain as constituents thereof significant percentages of the m,m' and/or the m,p'-isomers of the p,p'-sulfonyl dibenzoic acid without significant deleterious effect on the properties of these polyesters. In fact, when the polyesters is to be employed for many of the purposes to which it is suited, substantial quantities of these isomers can be incorporated into the polyester.

One embodiment of this invention relates to a process for preparing an incompletely cross-linked, soluble polyester comprising (A) condensing a dibasic acidic compound comprising a p,p'-sulfonyl dibenzoic acid diester having the formula:

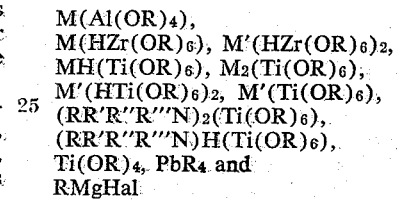

wherein $R_1$ and $R_4$ each represents a substituent selected from the group consisting of β-hydroxyalkyl radical containing from 2 to 4 carbon atoms, a hydroxyalkyl radical containing from 3 to 12 carbon atoms and an alkyl radical containing from 1 to 6 carbon atoms, (B) with a polyoxy compound comprising an aliphatic alcoholic compound containing at least 3 oxy radicals selected from the group consisting of glycerine, β-methylglycerine, sorbitol, pentaerythritol, dipentaerythritol, 1,2,4-trihydroxybutane, 2-methyl-2-hydroxymethyl-1,3-propanediol, and the lower alkanoic esters of these compounds wherein the acyl radicals contain from 2 to 4 carbon atoms, the polyoxy compound being employed in such a proportion that there is substantially an equivalent amount of oxy substituents in proportion to the carbalkoxy substituents in the overall combination of the dibasic acidic compounds and the polyoxy compounds, (C) in the presence of a condensing agent selected from the group consisting of the alkali metals, the alkaline earth metals, and oxides of these two groups of metals, the alkoxides containing from 1 to 6 carbon atoms of these two groups of metals, the carbonates and borates of these two groups of metals, litharge, and compounds having the following formulas:

$M(Al(OR)_4)$,
$M(HZr(OR)_6)$, $M'(HZr(OR)_6)_2$,
$MH(Ti(OR)_6)$, $M_2(Ti(OR)_6)$,
$M'(HTi(OR)_6)_2$, $M'(Ti(OR)_6)$,
$(RR'R''R'''N)_2(Ti(OR)_6)$,
$(RR'R''R'''N)H(Ti(OR)_6)$,
$Ti(OR)_4$, $PbR_4$ and
$RMgHal$ wherein M represents an alkali metal, M' represents an alkaline earth metal selected from the group consisting of magnesium, calcium and strontium, R represents an alkyl group containing from 1 to 6 carbon atoms, R', R'' and R''' each represents a member of the group consisting of R and an aryl group of the benzene series containing from 6 to 9 carbon atoms and Hal represents a halogen atom, (D) at an elevated temperature of from about 150° to about 250° C., (E) the condensation being conducted in an inert atmosphere with agitation.

The polyoxy compounds which can be employed in accordance with this invention are most advantageously polyhydroxy compounds; such compounds will hereinafter be referred to as polyhydroxy compounds although it is to be understood that esters thereof as referred to above are intended to be covered by this term.

According to a preferred embodiment of my invention, the dibasic acidic compound consists of a combination containing from about 10 to about 90 mol per cent of a p,p'-sulfonyl dibenzoic acid diester as defined above, and conversely from about 90 to about 10 mol per cent of a different dibasic acidic compound as a modifier which is selected from the group consisting of the aromatic acids of dicarboxybenzene series and aliphatic saturated and unsaturated acids, anhydrides and esters, e. g. maleic acid, maleic anhydride, maleic esters, fumaric acid, fumaric esters, itaconic acid, succinic acid, adipic esters, suberic acid, sebacic acid, oxalic acid, dibutyl azelate, dimethylmalonic acid, the dimethyl ester of α, α-dimethylglutaric acid, diglycollic acid, the dipropyl ester of β-oxydipropionic acid, phthalic anhydride, diethyl isophthalate, dihexyl terephthalate, p,p'-dicarbethoxybiphenyl, etc. A portion of or all of the dibasic acidic compound can be similarly replaced by fatty acids of linseed oil, cottonseed oil, tung oil, soybean oil, etc.

Moreover, it is advantageous to employ polyhydroxy compounds in the above-described process which consist of a combination containing from about 10 to about 90 mol per cent of an aliphatic alcoholic compound containing at least 3 hydroxy radicals (or lower alkanoic esters thereof) as described above, and conversely from about 90 to about 10 mol per cent of a dihydroxy compound selected from the group consisting of those compounds having the following formulas:

$$R_5—O—(CH_2)_p—O—R_6 \text{ and}$$
$$R_5O—(—R_7—O)_q—R_7—OR_6$$

wherein p represents a positive integer of from 2 to 12, $R_5$ and $R_6$ each represents a substituent selected from the group consisting of a hydrogen atom and an acyl radical containing from 2 to 4 carbon atoms, $R_7$ represents an alkylene radical containing from 2 to 4 carbon atoms and q represents a positive integer of from 1 to 10 inclusive, the polyhydroxy compounds being employed in such a proportion that there is at least an equivalent amount of hydroxy substituents in proportion to the carbalkoxy substituents in the overall combination of the dibasic acidic compounds and the polyhydroxy compounds. Such dihydroxy compounds are polymethylene glycols or aliphatic ether glycols which are described below.

When an additional modifying dibasic acidic compound is to be incorporated into the polyester being produced and an alkyl diester of p,p'-sulfonyl dibenzoic acid as described under (A) hereinabove is employed as the starting material, it is advantageous to react this sulfonyl dibenzoic ester with at least one of the polyhydroxy compounds described above prior to adding the catalyst and the additional modifying acidic compound. This preliminary condensation is advantageously conducted at an elevated temperature, after which preliminary step, this preliminary product can then be reacted with an additional aromatic or aliphatic saturated or unsaturated dibasic acidic compound as described above in the presence of a condensing agent as described under (C) and the condensation can then be completed as defined under (D), (E), and (F). Advantageously the elevated temperature employed during the preliminary step is substantially that at which reflux conditions subsist; however, higher and lower temperatures can also be employed. By employing this preliminary step the p,p'-sulfonyl dibenzoic acid alkyl diester is converted into a hydroxylalkyl ester or a low molecular weight polyester containing free hydroxy groups; this product is more readily susceptible to reaction with the unsaturated aliphatic dibasic acidic compound than is the alkyl diester.

The polyhydroxy compounds defined hereinabove may not actually contain any free hydroxy radicals since they may be in esterified form. However, these hydroxy or substituted hydroxy radicals are referred to generically as hydroxy radicals or substituents. Each of the dibasic acidic compounds defined above is considered as containing 2 carbalkoxy radicals as that term is employed in the definition of the processes as described above even though free acids, anhydrides, or esters are included within the scope of the term.

In addition to employing the preliminary step for converting the alkyl esters to hydroxyalkyl esters, this same preliminary step can be applied to converting the free p,p'-sulfonyl dibasic acid to its hydroxyalkyl ester.

The polymethylene glycols which can be employed in accordance with this invention are straight-chain alkane diols, viz. polymethylene glycols, wherein the hydroxy radicals are positioned at the two ends of the alkylene chain. Examples of such glycols include ethylene glycol 1,3-propylene glycol, tetramethylene glycol, octamethylene glycol, dodecamethylene glycol, etc. As indicated above, mono or diesters of these glycols can also be employed thus, the acetates, propionates, and butyrates are example of such esters. The defined ether glycols can be employed either in lieu of the polymethylene glycols or in conjunction therewith. Examples of ether glycols include diethylene glycol, triethylene glycol, tetraethylene glycol, bis (4-hydroxybutyl) ether, bis (3-hydroxypropyl) ether, etc. Advantageously the aliphatic ether glycols employed contain no more than 2 ether linkages, i. e. q is 1 or 2.

The catalytic condensing agents which can be employed have been described above. From about 0.005% to about 0.2% of such catalysts based on the weight of the dibasic acidic compounds being condensed can be employed. Higher or lower percentages can also be employed. Generally, from about 0.01% to about 0.06% of the catalytic condensing agent can be advantageously employed.

The temperatures at which polyesterification can be conducted is dependent upon the specific reactants involved in any given condensation reaction. In general, the reaction mixture can be heated with agitation at from about 150° to about 250° C. for from approximately 2 to 6 hours. When one of the preferred hydroxyalkyl diesters of p,p'-sulfonyl dibenzoic acid is being prepared by the described preliminary step beginning with the free acid or alkyl ester, the heating is advantageously conducted until the evolution water or alcohol is practically complete after which the additional dibasic acidic compound and a catalyst are added and heating is continued at a temperature which is advantageously in excess of about 200° C. for an additional 2 or 3 hours. The application of heat is accompanied with good agitation and is performed under an inert atmosphere. These conditions can be varied depending upon the degree of polyesterification desirable, the ultimate properties sought, the stability of the polyester being produced, and the use for which the product is intended.

It is important to exclude oxygen and moisture at all stages of the condensation reaction. Inert atmospheres which can be advantageously employed include nitrogen, hydrogen, helium, etc. Substantially anhydrous reactants can be advantageously employed although this is not essential especially if any of the water is removed in the earlier stages of the condensation.

The reaction can be carried out in the presence or absence of a solvent. Inert, high boiling compounds such as diphenyl ether, diphenyl, mixed tolyl sulfones, chlorinated naphthalene, chlorinated diphenyl, dimethylsulfolane, etc. can be used as the reaction medium.

As indicated above the acidic compounds can be employed in the form of their diesters, these diesters can be prepared by conventional means. The β-hydroxyalkyl diesters of sulfonyl dibenzoic acid can be prepared as described in my parent application employing an alkylene oxide. The acid chlorides can be employed in some cases although the conditions involved are generally substantially different.

Examples of the various diesters which can be employed are given in the examples set forth hereinbelow and include the ethyl, propyl, n-butyl, sec-butyl, isopropyl, sec-amyl, n-hexyl 10-hydroxydecyl, 5-hydroxyamyl, 12-hydroxydodecyl, 2-hydroxyethyl, etc. diesters of any of the dibasic acidic compounds described above.

As far as is known, any of the prior art catalytic condensing agents can be advantageously used; moreover, it has been found that certain novel catalysts also give advantageous results provided the dibasic acidic compounds used are esters. Such catalysts are described in copending applications filed on even date herewith. See Caldwell Serial No. 313,972, Serial No. 313,078, Caldwell and Reynolds Serial No. 313,077, Wellman and Caldwell Serial No. 313,074, Serial No. 313,075, and Serial No. 313,076, and Wellman Serial No. 313,073, which applications give a description of such novel catalytic condensing agents.

As indicated hereinabove some of the isomers of p,p'-sulfonyl dibenzoic acid and/or its esters can be employed. Moreover homologs of p,p'-sulfonyl dibenzoic acid can also be employed, e. g. m,m'-dimethyl-p,p'-sulfonyl dibenzoic acid, o-ethyl-p,p'-sulfonyl dibenzoic acid, m-methyl - o - propyl - p,p' - sulfonyl dibenzoic acid, etc. Fairly substantial proportions of the various diesters of such isomers and homologs can be employed in substitution for a corresponding quantity of the diester of p,p'-sulfonyl dibenzoic acid.

The products obtained as described above are generally viscous, semi-solid materials of gum-like nature when cool. These products are soluble in various solvents such as acetone, dioxane, various alcohols such as ethyl alcohol, various esters such as ethyl acetate, butyl acetate, toluene, ethylene dichloride, etc.

These soluble polyester products which can be prepared as described above can be converted into cross-linked, insoluble, infusible resinous products by heating in the presence of a gas containing free oxygen (e. g. air or oxygen) to a temperature of about 250° to about 300° C. or higher for several hours; however, it is more advantageous to accomplish the same result by adding a catalyst to facilitate the conversion to an infusible thermosetting resinous product. Catalysts which can be employed for this purpose are those which are well known in the art of preparing alkyd or glyptal resins and include compounds such as cobalt salts, manganese salts, lead salts (naphthenates, oleates, etc.), various acyl peroxides such as lauroyl peroxide, benzoyl peroxide, oleoyl peroxide, and various other peroxy compounds. When employing such catalysts, the heating in the presence of air or oxygen can be conducted for relatively short times (from a few minutes to a couple of hours) at relatively low temperatuers such as 160°–210°C.; if the polyester contains an unsaturated aliphatic modifying acid the temperature can be from about 60° to about 120°C.

The soluble polyesters prepared in accordance with the processes described above can be intermixed with various alkyd resins such as glycerine-phthalic acid resins, etc. They can also be admixed with a phenol-formaldehyde resin, etc. The number of such combinations is innumerable and the products which can be obtained can be varied in accordance with the properties of the modifying agents employed. Many types of valuable protective coatings can be thereby obtained. Valuable protective coatings such as varnishes can be obtained by mixing the soluble polyester products prepared as described above with various drying oils such as linseed oil, tung oil, etc.

This invention can be further illustrated by the following examples; in addition to these examples it is apparent that other variations and modifications thereof can be adapted to obtain similar results:

*Example 1.–Soluble polyester incorporating glycerine, diethylene glycol and phthalic anhydride*

420 grams (1 mole) of p, p'-sulfonyl dibenzoic acid dibutyl ester, 106 grams (1 mole) of diethylene glycol and 31 grams (0.33 mole) of glycerine were placed in a vessel equipped with a stirrer, a short distillation column and an inlet for purified hydrogen. 1 gram of litharge ($Pb_3O_4$) was added as a catalyst, and the mixture was stirred at 180–200°C. until the evolution of butyl alcohol was essentially completed. 7.5 grams (0.05 mole) of phthalic anhydride was added and heating was continued for an additional 30 to 50 minutes. The product obtained is a viscous syrup. It is soluble in acetone, ethylene dichloride, butyl acetate, and ethyl alcohol.

*Example 2.—Film from polyester of Example 1*

Some of the product of Example 1 was dissolved in acetone and a film thereof was coated on a glass plate. On heating in the air at 180°–200°C. the film became exceptionally hard, insoluble, infusible, and highly resistant to scratching, marking and the effects of water.

*Example 3.—Soluble polyester incorporating glycerine, diethylene glycol and maleic anhydride*

420 grams (1 mole) of p,p'-sulfonyl dibenzoic acid dibutyl ester, 106 grams (1 mole) of diethylene glycol and 31 grams (0.33 mole) of glycerine were placed in a reaction vessel equipped with a stirrer, a short distillation column and an inlet for purified hydrogen. 1 gram of litharge was added as a catalyst and the mixture was stirred under purified hydrogen at 180–200°C. until the evolution of butyl alcohol was essentially complete. 50 grams (0.5 mole) of maleic anhydride was then added and heating was continued for 30 to 50 minutes. The product obtained is a viscous syrup. It is soluble in acetone, ethylene dichloride, dioxane, ethyl acetate, and ethyl alcohol.

*Example 4.—Film from polyester of Example 3*

Some of the product obtained in Example 3 was dissolved in ethyl alcohol and 1% by weight of this polyester product of cobalt naphthenate was added to the solution. This solution was then coated upon a steel plate and baked at 120°–140° C. in air. Its characteristics are the same as those of the film described in Example 2.

*Example 5—Soluble polyester incorporating glycerine, diethylene glycol, maleic anhydride and linseed oil fatty acids*

The apparatus described in Example 1 was employed for the preliminary condensation by the same procedure of 10 grams of p,p'-sulfonyl dibenzoic acid with 10 grams of glycerine and 20 grams of diethylene glycol at 200–210° C. over a period of 8 hours. The resulting hydroxyalkyl diester product formed a clear solution to which 5 grams of maleic anhydride and 10 grams of linseed oil fatty acids were added. Heating and stirring were continued at 200–210°C. for an additional 30 to 60 minutes. The resulting product is a viscous syrup. It is soluble in acetone, ethyl alcohol, etc.

*Example 6.—Film from polyester of Example 5*

Some of the polyester obtained as described in Example 5 was dissolved in acetone to which was added 0.5 per cent by weight of the polyester of cobalt naphthenate and of manganese naphthenate. A film was formed from this solution on a glass surface. The film was baked at 120°–140°C. whereupon it acquired the properties described in Example 2.

*Example 7.—Soluble polyester incorporating glycerine, diethylene glycol and maleic anhydride*

42 grams of p,p'-sulfonyl dibenzoic acid diethyl ester and 20 grams of diethylene glycol were mixed in a vessel similar to that described in Example 1. 0.1 gram of sodium titanium butoxide was then added as a catalyst and the mixture was stirred at 200–210°C. until the evolution of ethyl alcohol was practically complete. 9 grams of glycerine and 20 grams of maleic anhydride were then added and heating was continued for from one to one and a half hours. This entire process was conducted with constant agitation under an inert atmosphere of nitrogen. The product obtained is soluble in dioxane.

*Example 8.—Film from polyester of Example 7*

The product described in Example 7 was dissolved in dioxane and 2% by weight of the polyester of benzoyl peroxide was added as a catalyst. A film was formed and baked at 130–150° C. whereupon it acquired the properties described in Example 2. Similar films can be obtained employing manganese and cobalt salts in lieu of the benzoyl peroxide catalyst.

*Example 9.—Polyester incorporating glycerine, diethylene glycol and maleic anhydride*

The same product as described in Example 7 was obtained employing the same apparatus and procedure except for the use of 0.2 gram of potassium ethoxide as the catalyst in lieu of sodium titanium butoxide. Films such as described in Example 2 can be produced from this polyester.

Other condensation catalysts can be similarly employed in Example 9 or in any of the other examples set forth herein. Examples of such catalysts include potassium carbonate, lithium borate, sodium, magnesium (especially when activated with iodine vapors), potassium oxide, etc.

*Example 10.—Polyester incorporating pentaerythritol, diethylene glycol and maleic anhydride*

The apparatus described in Example 1 was used in preparing a polyester in accordance with the same procedure described in Example 7 except that the glycerine was replaced with an equimolecular quantity of pentaerythritol. A viscous syrup was obtained which can be employed in the preparation of films in a manner similar to that described in Example 8.

*Example 11.—Polyester incorporating β-ethylglycerine, diethylene glycol and phthalic anhydride*

The apparatus described in Example 1 was employed in preparing a polyester by the same procedure as described in Example 1 except that glycerine was replaced with 0.33 gram moles of β-methylglycerine. The product obtained was similar to that described in Example 1 and was used to form films having properties as described in Example 2.

*Example 12.—Polyester incorporating 2-methyl-2-hydroxymethyl-1,3-propanediol, diethylene glycol and phthalic anhydride*

The apparatus described in Example 1 was employed to prepare a polyester in accordance with the procedure described in Example 1 except that the glycerine was replaced with 0.33 gram moles of 2-methyl-2-hydroxymethyl-1,3-propanediol. The product obtained is a viscous syrup which can be employed in the preparation of films as described in Example 2.

*Example 13.—Polyester incorporating 1,2,4-trihydroxybutane, diethylene glycol and phthalic anhydride*

The apparatus described in Example 1 was employed in preparing a polyester by the same procedure as described in Example 1 except that glycerine was replaced with 0.33 gram moles of 1,2,4-trihydroxybutane. The product obtained was similar to that described in Example 1 and was used to form films having properties as described in Example 2.

*Example 14.—Polyester incorporating sorbitol, diethylene glycol and phthalic anhydride*

The apparatus described in Example 1 was employed in preparing a polyester by the same procedure as described in Example 1 except that glycerine was replaced with 0.33 gram moles of sorbitol. The product obtained was similar to that described in Example 1 and was used to form films having properties as described in Example 2.

*Example 15.—Polyester incorporating dipentaerythritol, diethylene glycol and phthalic anhydride*

The apparatus described in Example 1 was employed in preparing a polyester by the same procedure as described in Example 1 except that glycerine was replaced with 0.33 gram moles of dipentaerythritol. The product obtained was similar to that described in Example 1 and was used to form films having properties as described in Example 2.

*Example 16.—Polyester incorporating glycerine, tetramethylene glycol and phthalic anhydride*

The apparatus described in Example 1 was employed to prepare a polyester using the procedure described therein except that the diethylene glycol was replaced with 1 gram mole of tetramethylene glycol (90 grams). The viscous syrup obtained was a useful polyester in the preparation of films as described in Example 2.

*Example 17.—Polyester incorporating β-methylglycerine, ethylene glycol and phthalic anhydride*

The apparatus described in Example 1 was employed to prepare a polyester in accordance with the procedure set forth in that example except that the diethylene glycol was replaced with one gram mole of ethylene glycol and the glycerine was replaced with 0.33 gram mole of β-methylglycerine (i. e. 2-methyl-1,2,3-propanetriol). A viscous syrup was obtained which can be employed to prepare polyester films as described in Example 2.

I claim:

1. A process for preparing an incompletely cross-linked soluble polyester comprising (A) condensing a dibasic acidic compound comprising a p,p′-sulfonyl dibenzoic acid diester having the formula:

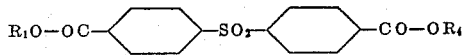

wherein $R_1$ and $R_4$ each represents a substituent selected from the group consisting of β-hydroxyalkyl radical containing from 2 to 4 carbon atoms, a hydroxyalkyl radical containing from 3 to 12 carbon atoms and an alkyl radical containing from 1 to 6 carbon atoms, (B) with a polyoxy compound comprising an aliphatic alcoholic compound containing at least 3 oxy radicals selected from the group consisting of glycerine, β-methylglycerine, sorbitol, pentaerythritol, dipentaerythritol, 1,2,4-trihydroxybutane, 2-methyl-2-hydroxymethyl-1,3-propanediol, and lower alkanoic esters of these compounds wherein the acyl radicals contain from 2 to 4 carbon atoms, the polyoxy compound being employed in such a proportion that there is substantially an equivalent amount of oxy substituents in proportion to the carbalkoxy substituents in the overall combination of the dibasic acidic compounds and the polyoxy compounds, (C) in the presence of a condensing agent selected from the group consisting of the alkali metals, the alkaline earth metals, the oxides of these two groups of metals, the alkoxides containing from 1 to 6 carbon atoms of these two groups of metals, the carbonates and borates of these two groups of metals and litharge, (D) at an elevated temperature of from about 150° to about 250°C, (E) the condensation being conducted in an inert atmosphere with agitation.

2. A process as defined in claim 1 wherein the condensing agent is employed in an amount of from about 0.005% to about 0.2% based on the weight of the dibasic acidic compound employed.

3. A process as defined in claim 2 wherein all materials employed in the process are substantially anhydrous.

4. A process as defined in claim 1 wherein the sulfonyl dibenzoic diester is hydroxyalkyl diester formed by a preliminary step comprising condensing a dialkyl ester of p,p′-sulfonyl dibenzoic acid wherein the alkyl radical contains from 1 to 6 carbon atoms with the polyoxy compound which is defined under (B) at an elevated temperature until the alkyl diester is substantially converted to the hydroxyalkyl diester, after which preliminary step the condensing agent which is defined under (C) is added and the condensation is completed as defined under (D) and (E).

5. A process as defined in claim 4 wherein the preliminary elevated temperature is substantially that at which reflux conditions subsist thereby facilitating the removal of alkanol, the subsequent condensation being conducted at an increased temperature up to about 250° C.

6. A process as defined in claim 5 wherein the condensing agent is employed in an amount of from about 0.005% to about 0.2% based on the weight of the dibasic acidic compound employed.

7. A process as defined in claim 6 wherein all materials employed in the process are substantially anhydrous.

8. A process as defined in claim 1 wherein the dibasic acidic compound consists of a combination containing from about 10 to about 90 mole percent of a p,p-sulfonyl dibenzoic acid diester as defined above, and conversely from about 90 to about 10 mole per cent of a different dibasic acidic compound as a modifier which is selected from the group consisting of the aromatic acids of dicarboxybenzene series and aliphatic saturated and unsaturated acids, anhydrides and esters.

9. A process as defined in claim 1 wherein the polyoxy compound consists of a combination containing from about 10 to about 90 mole per cent of an aliphatic alcoholic compound containing at least 3 hydroxy radicals as defined in claim 1, and conversely from about 90 to about 10 mole per cent of a dioxy compound selected from the group consisting of those compounds having the following formulas:

$$R_5\text{—}O\text{—}(CH_2)_p\text{—}O\text{—}R_6 \text{ and}$$
$$R_5O\text{—}(\text{—}R_7\text{—}O)_q\text{—}R_7\text{—}OR_6$$

wherein $p$ represents a positive integer of from 2 to 12, $R_5$ and $R_6$ each represents a substituent selected from the group consisting of a hydrogen atom and an acyl radical containing from 2 to 4 carbon atoms, $R_7$ represents an alkylene radical containing from 2 to 4 carbon atoms and $q$ represents a positive integer of from 1 to 10 inclusive.

10. A process as defined in claim 9 wherein the dibasic acidic compound consists of a combination containing from about 10 to about 90 mole per cent of a p,p'-sulfonyl dibenzoic acid diester as defined above, and conversely from about 90 to about 10 mole per cent of a different dibasic acidic compound as a modifier which is selected from the group consisting of the aromatic acids of dicarboxybenzene series and aliphatic saturated and unsaturated acids, anhydrides and esters.

11. A process as defined in claim 10 wherein the condensing agent is employed in an amount of from about 0.005% to about 0.2% based on the weight of the dibasic acidic compound employed.

12. A process as defined in claim 11 wherein all materials employed in the processs are substantially anhydrous.

13. A process as defined in claim 12 wherein the dibasic acidic compound consists of a combination containing a p,p'-sulfonyl dibenzoic diester and phthalic anhydride, and the polyoxy compound consists of a combination containing glycerine and diethylene glycol.

14. A process as defined in claim 12 wherein the dibasic acidic compound consists of a combination containing a p,p'-sulfonyl dibenzoic diester and maleic anhydride, and the polyoxy compound consists of a combination containing glycerine and diethylene glycol.

15. A process as defined in claim 12 wherein the dibasic acidic compound consists of a combination containing a p,p'-sulfonyl dibenzoic diester and maleic anhydride and linseed oil fatty acids, and the polyoxy compound consists of a combination containing glycerine and diethylene glycol.

16. A process as defined in claim 12 wherein the dibasic acidic compound consists of a combination containing a p,p'-sulfonyl dibenzoic diester and maleic anhydride, and the polyoxy compound consists of a combination containing pentaerythritol and diethylene glycol.

17. A process as defined in claim 12 wherein the dibasic acidic compound consists of a combination containing a p,p'-sulfonyl dibenzoic diester and phthalic anhydride, and the polyoxy compound consists of a combination containing β-methylglycerine and ethylene glycol.

18. An incompletely cross-linked, soluble polyester prepared in accordance with the process defined in claim 1.

19. An infusible, cross-linked, insoluble polyester prepared by heating the polyester defined by claim 18 in the presence of a gas containing free oxygen.

20. Polyesters prepared as defined in claim 1.
21. Polyesters prepared as defined in claim 13.
22. Polyesters prepared as defined in claim 14.
23. Polyesters prepared as defined in claim 15.
24. Polyesters prepared as defined in claim 16.
25. Polyesters prepared as defined in claim 17.

References Cited in the file of this patent

UNITED STATES PATENTS

| | | |
|---|---|---|
| 2,547,113 | Drewitt et al. | Apr. 3, 1951 |
| 2,614,120 | Caldwell | Oct. 14, 1952 |

FOREIGN PATENTS

| | | |
|---|---|---|
| 621,977 | Great Britain | Apr. 25, 1949 |

OTHER REFERENCES

Ellis: Chemistry of Synthetic Resins, 1935, pages 862, 873, and 885.